(12) United States Patent
Brazier

(10) Patent No.: US 7,533,741 B2
(45) Date of Patent: May 19, 2009

(54) SWIVEL MOUNTED TRACK FRAME

(76) Inventor: Glen Brazier, 202 Cleveland Ave. E, Karlstad, MN (US) 56732-0239

(*) Notice: Subject to any disclaimer, the term of this patent is extended or adjusted under 35 U.S.C. 154(b) by 460 days.

(21) Appl. No.: 11/351,141

(22) Filed: Feb. 9, 2006

(65) Prior Publication Data
US 2007/0181351 A1 Aug. 9, 2007

(51) Int. Cl.
B62D 55/00 (2006.01)
(52) U.S. Cl. .................. 180/9.5; 180/9.52; 305/132
(58) Field of Classification Search .................. 180/9.5, 180/9.52; 305/132
See application file for complete search history.

(56) References Cited
U.S. PATENT DOCUMENTS
4,681,177 A * 7/1987 Zborowski ................ 180/9.56
4,881,609 A * 11/1989 Purcell et al. ............... 180/9.5
5,352,029 A * 10/1994 Nagorcka .................. 305/199

* cited by examiner

Primary Examiner—Paul N Dickson
Assistant Examiner—Michael R Stabley
(74) Attorney, Agent, or Firm—DL Tschida

(57) ABSTRACT

Track frame assemblies wherein one assembly provides a multi-section sub-frame that supports a series of idler wheel suspensions. Each section is mounted to pivot laterally from stub axles longitudinally secured to a drive frame. In another assembly, resilient bushings support idler wheel suspension axles to the track frame. The track frame also supports a detachable track tensioner containing idler wheels that facilitate track removal and replacement. A detachable hub at a track drive sprocket/drum further enhances frame mounting. Elastomer shim and air bag assemblies also torsionally control and limit rotation of the track assemblies.

38 Claims, 5 Drawing Sheets

SWIVEL MOUNTED TRACK FRAME

BACKGROUND OF THE INVENTION

The present invention relates to a track assembly that permits multi-axial movement of associated idler or "bogey" track support wheels and, in particular, to a two-piece frame assembly wherein several longitudinal stub-axles fitted between a drive frame and a multi-section sub-frame support a number of idler wheels to pivot laterally and/or multi-axially. Also disclosed are idler wheel rocker suspension axles mounted to the track frame from elastomer bushings, a removable belt tensioner assembly, a two-piece drive sprocket and an air bag torsion control assembly.

Track supported vehicles and equipment are designed for a variety of applications. The tracks enhance traction, distribute vehicle weight and reduce loading over an enlarged ground contact surface. Track systems of various designs are commonly used with military, commercial, farm, construction, personal (e.g. truck) and sport/leisure (e.g. snowmobiles and ATVs) vehicles. Tracks are also used in a variety of other applications with passive, un-powered equipment, for example, trailers, irrigation equipment and the like.

Depending upon the application, the track support frame and/or mounting system desirably provides some freedom to movement at the track assembly to compensate for the changing characteristics of the support terrain and/or enhance operating performance and/or track retention. A track assembly of applicant that provides torsion control is shown at U.S. Pat. No. 5,607,210. Another track assembly of applicant that is compatible with the subject invention is shown at U.S. Pat. No. 6,926,105.

U.S. Pat. No. 5,954,148 discloses a track assembly having a sub-frame that permits limited lateral rotation of a portion of the included idler wheels that are fitted to an intermediate idler sub-frame. An included support rod restricts the range of lateral rotation.

The present invention was developed to provide an improved track frame assembly wherein the idler or "bogey" wheels are able to pivot laterally to maintain uniform track contact and accommodate track flexion with changing terrain. In one construction, the idler wheels of a multi-section, longitudinal sub-frame are supported to laterally pivot from a supporting drive frame. The sub-frame sections, which contain several idler wheels mounted to rocker suspensions, are supported from pivot bearings fitted to an overlying drive frame.

In another track assembly, elastomer bushings are fitted to idler rocker suspension axles that support opposed sets of idler wheels. The resilient mounting of the suspension axles and contained idler wheels permit multi-axial movement of the wheels and axles to compensate for changes in the terrain and enhance track retention.

A tensioner that supports several idler wheels is also disclosed that detachably mounts as a nosepiece to a track frame (e.g. sub-frame or drive frame). The extension or retraction of included idler wheels selectively adjusts track tension and detachment of the tensioner facilitates track removal and replacement.

A multi-section drive sprocket/drive wheel/drum is also disclosed. The sprocket provides a removable center hub that is adaptable to a variety of vehicle mounts.

An air bag assembly is also mounted between the chassis and track frame to provide anti-torsion properties to control and limit rotation of the track frame.

SUMMARY OF THE INVENTION

It is a primary object of the invention to provide a track assembly wherein included idler wheels are resiliently suspended to permit independent lateral movement of the idler wheels.

It is further object of the invention to provide idler wheels that are mounted to a longitudinal sub-frame that is adapted to pivot laterally.

It is an object of the invention to provide a track assembly having a drive frame that supports several sub-frame sections that can collectively or independently pivot laterally, each section supports several idler wheels from rocker suspensions and interconnects to the drive frame at longitudinal frame axle(s).

It is further object of the invention to provide a track assembly wherein one or more idler wheel suspension axles are fitted with resilient mountings that provide flexion and resilience to accommodate axially constrained or 360° idler axle movement relative to the track framework.

It is further object of the invention to provide a multi-section sub-frame assembly wherein the sub-frame sections are mounted to independently rotate laterally about longitudinal stub axles fitted to resilient or rigid bearing surfaces at an associated drive frame.

It is further object of the invention to fit idler rocker suspension axles that support several idler wheels with elastomer bushings at an associated support frame.

It is further object of the invention to provide a detachable frame section to facilitate track removal, such as a drive belt tensioner configured as a detachable nosepiece, to either a sub-frame or drive frame and relative to which contained idler wheels are mounted to extend and retract to vary track tension.

It is further object of the invention to provide a two-piece drive sprocket wherein a hub piece is detachable from a concentric sprocket piece (e.g. flat sprocket, drum or wheel-like assembly). The sprocket piece is constructed to engage drive lugs that project from an interior track surface.

It is further object of the invention to provide an air bag between the chassis and track frame to torsionally control and limit rotation of the track frame relative to the chassis.

The foregoing objects, advantages and distinctions of the invention are obtained in alternative track frame assemblies. In one construction, a sub-frame assembly supports several rows of idler wheels from rocker suspensions mounted to one or several interconnected or independently supported sub-frame sections. The sub-frame section(s) are each secured to the drive frame with longitudinal stub axles fitted to the drive frame. The stub axles allow the sub-frame(s) to collectively or independently pivot laterally at bearing surfaces relative to the drive frame.

In another frame assembly, idler rocker suspension axles that support opposed sets of idler wheels are independently supported from resilient bearing surfaces at the drive frame. An elastomer bushing is particularly provided between each idler rocker axle and a bearing piece fitted to the drive frame. The elastomer suspension provides a degree of flexion and resilience to provide an axially constrained range of motion or 360° of motion for each idler axle to maintain track and terrain contact.

A detachable track frame section, for example a track tensioner is also provided at the track frame that supports some of the idler wheels. In one track assembly, the tensioner is detachably mounted as a nosepiece to the drive frame and included idler wheels are mounted to extend and retract to selectively adjust track tension. With a limited release of track tension and detachment of the tensioner bracket from the track frame, track removal and replacement is facilitated.

A two-piece drive sprocket assembly is also provided. A hub piece is detachably mounted to a concentric sprocket piece and facilitates repair, replacement or substitution of the hub and sprocket pieces. The sprocket piece is constructed to engage drive lugs that project from an interior track surface.

An air bag is also mounted between a stationary bracket that projects from the chassis and fore-end of the track frame to torsionally control and limit rotation of the track frame relative to the chassis.

Still other objects, advantages, distinctions and constructions and combinations of individual features of the invention will become more apparent from the following description with respect to the appended drawings. Similar components and assemblies are referred to in the various drawings with similar alphanumeric reference characters. The description to each combination should therefore not be literally construed in limitation of the invention. Rather, the invention should be interpreted within the broad scope of the further appended claims.

DESCRIPTION OF THE PREFERRED EMBODIMENTS

Figure 1:
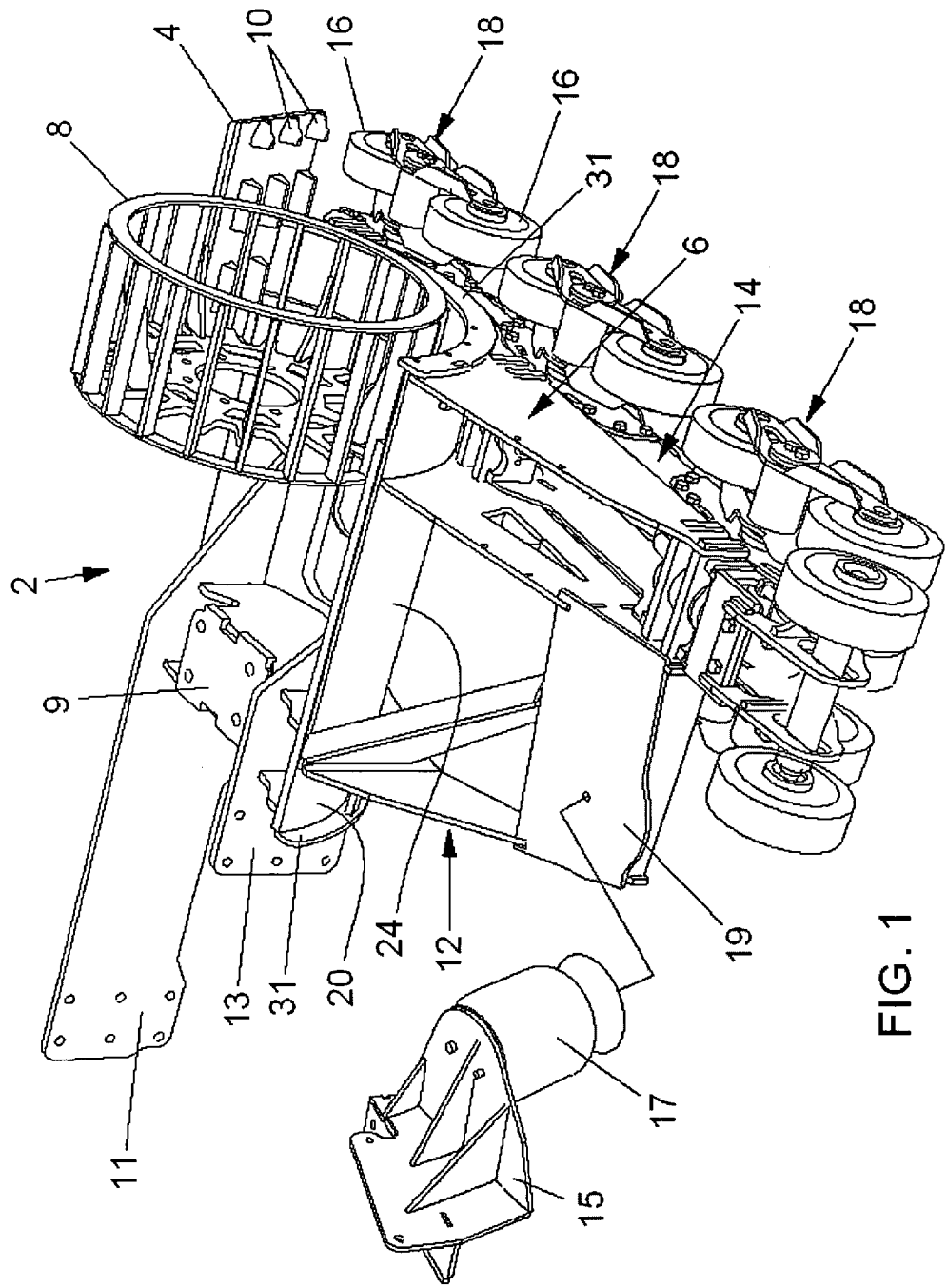
FIG. 1 shows a perspective view to a chassis supported track assembly.
Figure 2:
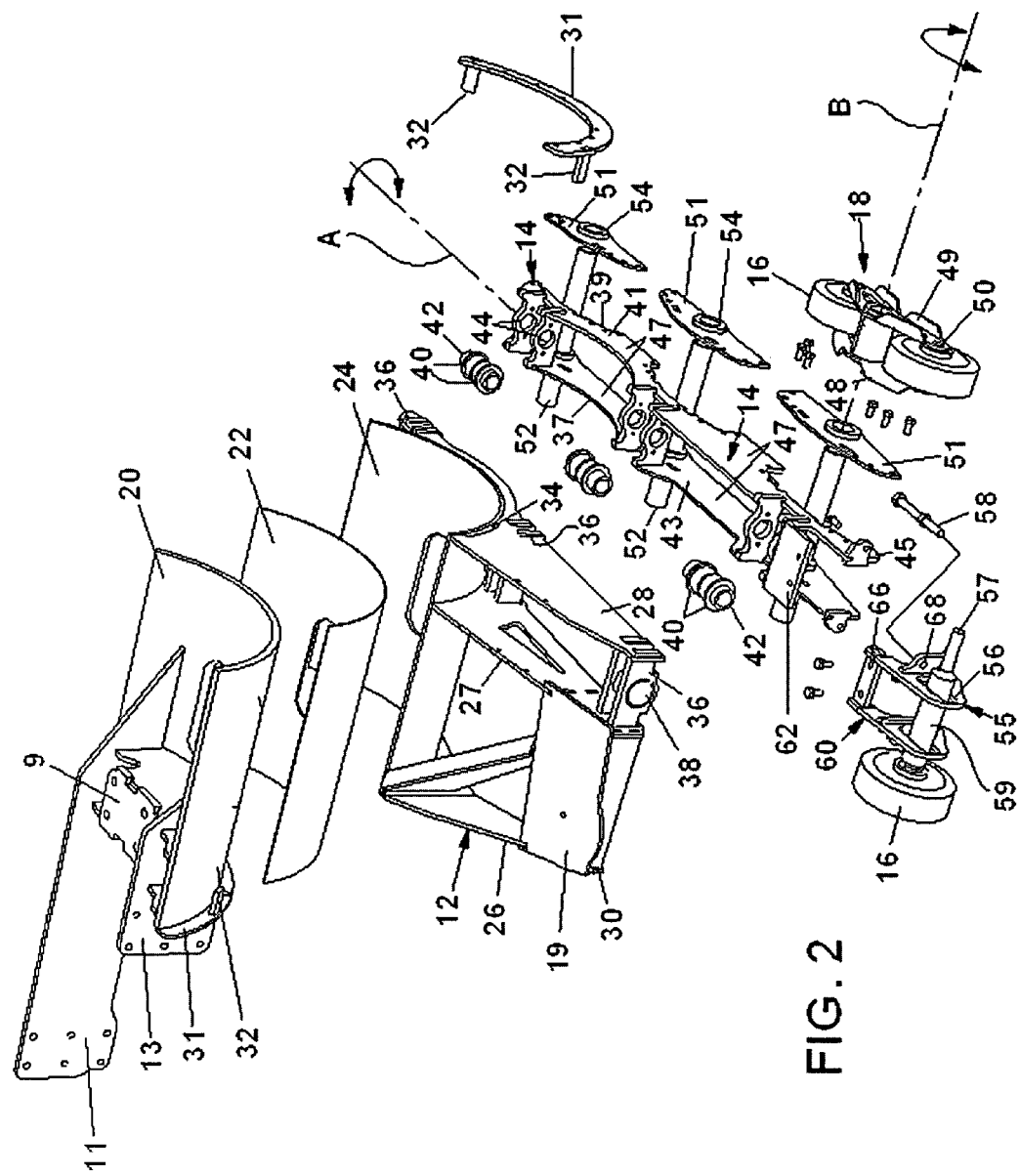
FIG. 2 shows a perspective view in exploded assembly of the hinged idler wheel suspension incorporated into a chassis supported track assembly.

With attention to FIGS. 1 and 2 perspective views are shown to an improved track assembly 2 of a type described at U.S. Pat. No. 6,926,105. The assemblies 2 find application with relatively heavy weight vehicles. The assembly 2 includes an endless, belted track 4 that surrounds a framework 6. A drive sprocket 8 (e.g. geared drum or other rotating geared device) at the framework 6 mounts to a vehicle axle and engages lugs 10 at the interior surface of the track 4. The sprocket 8 can be actively driven by an associated vehicle or piece of mobile equipment (not shown) or can be mounted to passively rotate such as when mounted to a non-driven axle or a towed piece of equipment.

A load bearing support or drive frame 12 depends beneath the drive sprocket 8 and attaches to the chassis of the vehicle/equipment via a bracket 9. Adjoining brackets 11 and 13 span the width of the vehicle and mount to an opposed track assembly 2. A multi-section sub-frame 14 separately mounts to the drive frame 12 and supports several sets of idler wheels 16. The idler wheels 16 are mounted to three sets of idler rocker suspensions 18 at three sub-frame sections. The sub-frame sections and attached rocker suspensions 18 are mounted to collectively, laterally pivot relative to the drive frame 12. Each rocker suspension 18 is also able to independently pivot longitudinally relative to the other suspensions 18. The diameter, width, construction and mounting location of the drive sprocket 8 and the idler wheels 16 can be varied as desired to accommodate any particular application. Additional details to the drive frame 12, sub-frame 14 and idler rocker suspensions 18 are shown at the exploded assembly view of FIG. 2. As also discussed below, the sub-frame sections can also be mounted to independently pivot laterally from each other.

A third bracket 15 projects from the drive frame 12 and attaches to the chassis. The bracket 15 supports an air bag 17 between the bracket 15 and a bracket 19 at the fore-end of the drive frame 12. The air bag 17 provides a resilient interface that expands and contracts with encountered shocks to torsionally limit rotational movement of the track frame 6 relative to the chassis bracket 13. The pneumatic properties are selected to accommodate the loading. Stops can cooperate with the air bag 17 to define a limited range of track rotation. The air bag 17 presently contains a pneumatic media, although a hydraulic container and media may be desired in some applications.

With attention to FIG. 2 and the drive frame 12, an arcuate chassis plate 20 is provided that rigidly attaches to the vehicle chassis at the bracket 9. A bearing liner 22 mounts between the chassis plate 20 and an arcuate bearing support plate 24 that spans the width of the drive frame 12. The liner 22 can be constructed from a variety of slippery materials (e.g. hdpe, Kevlar, nylon/polyethylene composites) that are able to withstand the weight of the supported load and normal operating environment and conditions. The sprocket 8 nests in the space above the chassis plate 20. The bearing plate 24 rotates relative to the chassis plate 20 and slides over the liner 22.

The chassis plate 20, bearing liner 22 and support plate 24 are supported by longitudinal side and interior frame pieces 26, 27 and 28 of a support frame 30. Exterior end pieces 31 bolt to the side of the chassis plate 20 (holes not shown) to detachably retain the bearing plate 24. Link arms 32 extend from the end pieces 31 and mate with slotted channels 34 let into the frame pieces 28 and 26. The link arms 32 limit the rotation of the support plate 24 relative to the chassis plate 20.

Mounted between the frame pieces 27 and 28 along the longitudinal side of the drive frame 12 are several pivoting bearing brackets 36. Each bracket 36 provides a longitudinal, tubular bore piece 38. Appropriate roller or sleeve bearings 40 fitted to several stub-axles 42 mount within each bore 38 and hinge the sub-frame 14 to the drive frame 12.

The stub axles 42 mount to the sub-frame 14 at longitudinal collars 44 provided at the ends of several sub-frame sections 41, 43 and 45. Each sub-frame section 41, 43 and 45 supports an idler wheel suspension 18. The collars 44 separately mate with the bearings 40 at the stub axles 42. Collectively, the stub axles 42 support the sub-frame 14 such that the sub-frame sections 41, 43 and 45 collectively pivot in unison relative to the drive frame 12. The sub-frame sections 41, 43 and 45 can be made to each pivot laterally independent of the others relative to the drive frame 12 appropriately decoupling each from an adjacent sub-frame section such as in the regions 47 of the sub-frame 14.

The improved flexibility of the sub-frame 14 and/or sub-frame sections 41, 43 and 45 to laterally pivot enables the idler wheels 16 at each idler suspension 18 to laterally pivot and better maintain contact with the track 4 as the track 4 follows changing terrain contours. The improved mounting of the idler wheels 16 also assures that they maintain a more uniform orientation with the track 4 and with less loading at the interior of the track 4. Stress and possible dislodgment of the track 4 are also reduced.

FIG. 2 depicts one of three sets of idler rocker suspensions 18 fitted to each sub-frame section 41, 43 and 45. One or more additional idler suspensions 18 can be fitted between the outer idler suspensions 18 for wide track applications. The interior idler suspensions 18 might be fitted between the sidewall plates 37 and 39 of one or more of the frame sections 41, 43 and 45.

The idler wheels 16 of each idler rocker suspension 18 are mounted between opposed axle plates 48 and 49. Fore and aft idler axles 50 extend between the plates 48 and each axle 50 supports an idler wheel 16. The axle plates 48 mount parallel to end plates 51 fitted over the idler suspension axles 52 that extend through the sub-frame sections 41, 43 and 45. Appropriate roller and/or sleeve bearings or bushings 54 mounted to the end plates 51 support the axles 52 from the sides of the sub-frames 41, 43 and 45. Collectively, the axles 42 and 52 act in a fashion akin to a universal joint and enable a wide range of motion at each idler suspension 18. The axles 42 and 52 particularly enable the idler suspensions 18 and contained idler wheels 16 to pivot laterally relative to a longitudinal axis "A" and longitudinally relative to lateral axis "B" to accommodate the longitudinal rotation of the track 4 and longitudinal and lateral movements of the track 4 with undulating conditions in the terrain.

The flexibility and/or resilience of each sub-frame 41, 43 and 45 and idler rocker suspension 18 can be enhanced with resilient fittings, such as elastomer bushings as discussed below, that can be mounted between the bearing surfaces (e.g. bearings 40 and 54) and the axles 50 and 52 and/or to the sectional sub-frames 41, 43 and 45 to provide further freedom of movement to the idler suspensions 18 and idler wheels 16. Collectively, the additionally enhanced freedom of motion enables the idler wheels 16 to maintain a more uniform track contact, with less loading and reduced chance of track dislodgment with changing terrain contours.

Extending from the frame section 43 is a detachable "nosepiece" tensioner 55. The tensioner 55 supports a pair of idler wheels 16 from an axle 57 fitted in a sleeve 59 mounted in slots 56. The alignment of the axle 57 and idler wheels 16 along the slots 56 is determined by a pair of threaded adjusters 58 (only one of which is shown) mounted to the opposite sides of bracket 68. The adjusters 58 permit the operator to selectively extend or retract the wheels 16 relative to the interior surface of the drive track 4 and as necessary adjust track tension.

Normally, track tensioners are constructed as a non-detachable portion of the track frame 6. Difficulties, however, arise when adjusting and replacing relatively large tracks 4 and especially wide tracks 4, due to the relatively limited longitudinal range of adjustment versus the width of the track 4. The detachable nosepiece tensioner 55 significantly facilitates the process of track replacement by permitting the removal of the tensioner 55, upon releasing the idler wheels from track contact, to enhance the available interior frame space when removing and replacing a track 4. In lieu of or in addition to the tensioner 55, other portions of the framework 6 can be constructed to judiciously detach to aid in track repair and/or replacement.

Figure 3:
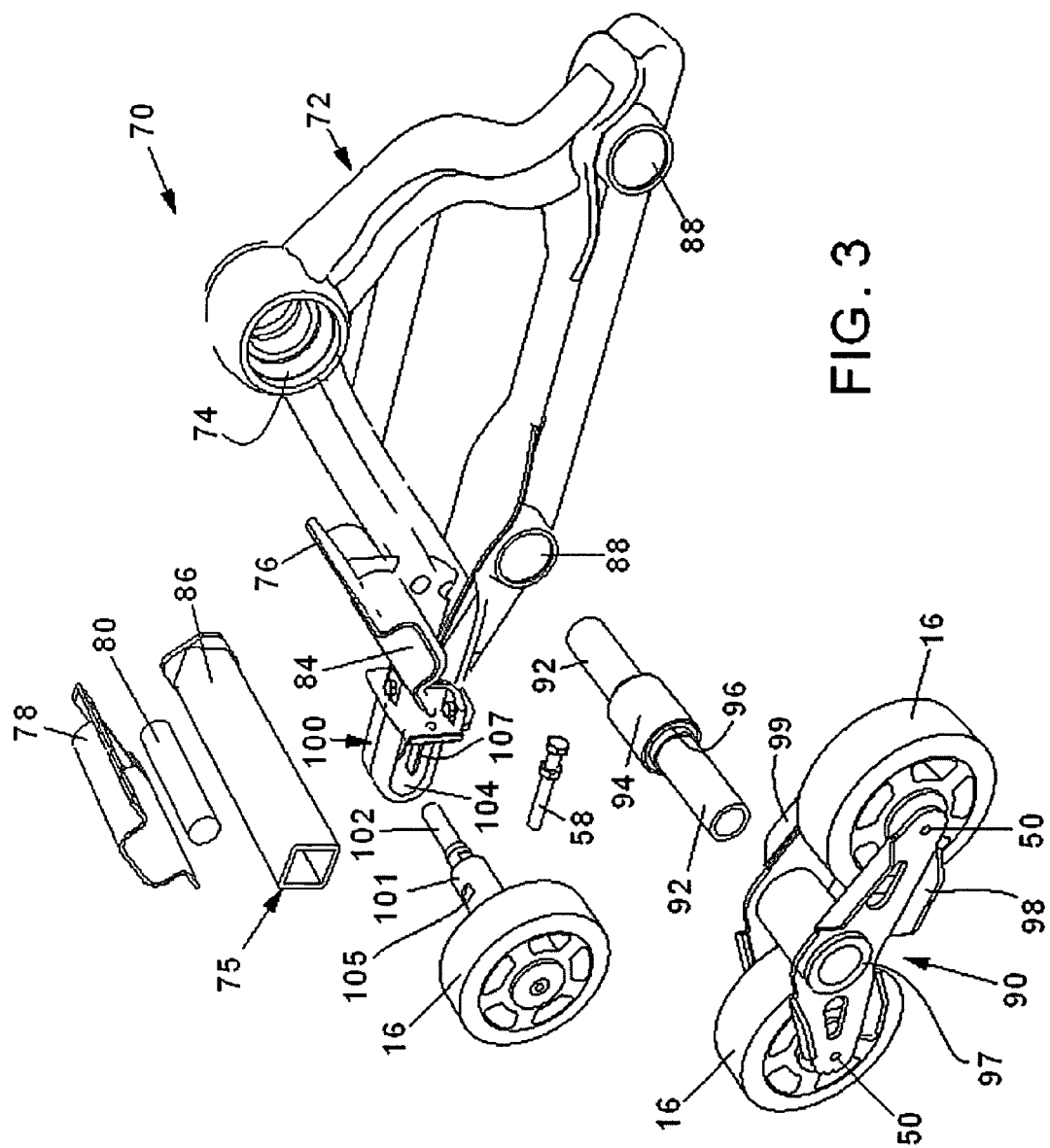
FIG. 3 shows a perspective view in exploded assembly of an elastomer supported idler wheel suspension incorporated into a wheel-mounted track assembly.
Figure 4:
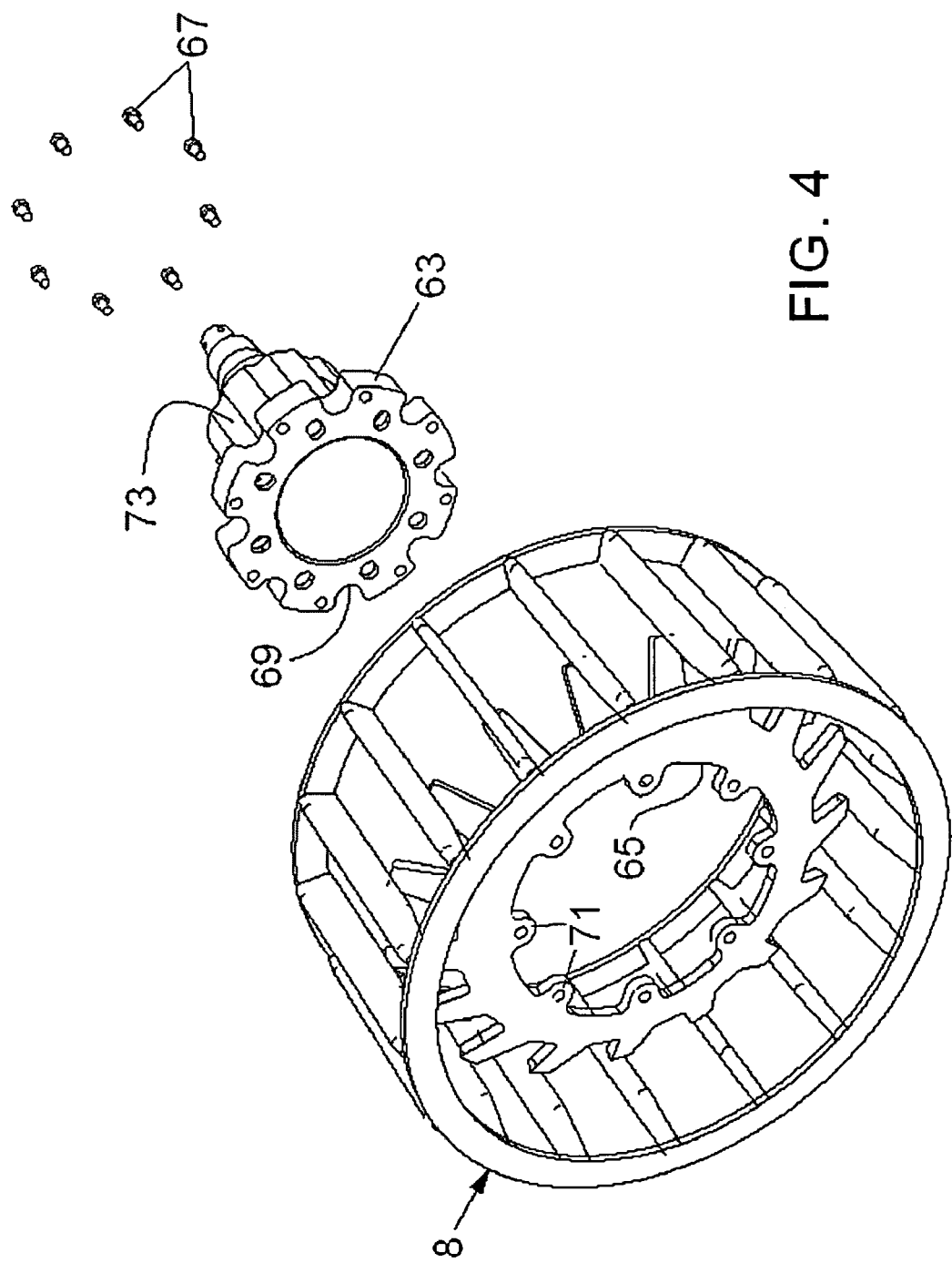
FIG. 4 shows a perspective view in exploded assembly to a two-piece sprocket assembly of FIG. 3.
Figure 5:
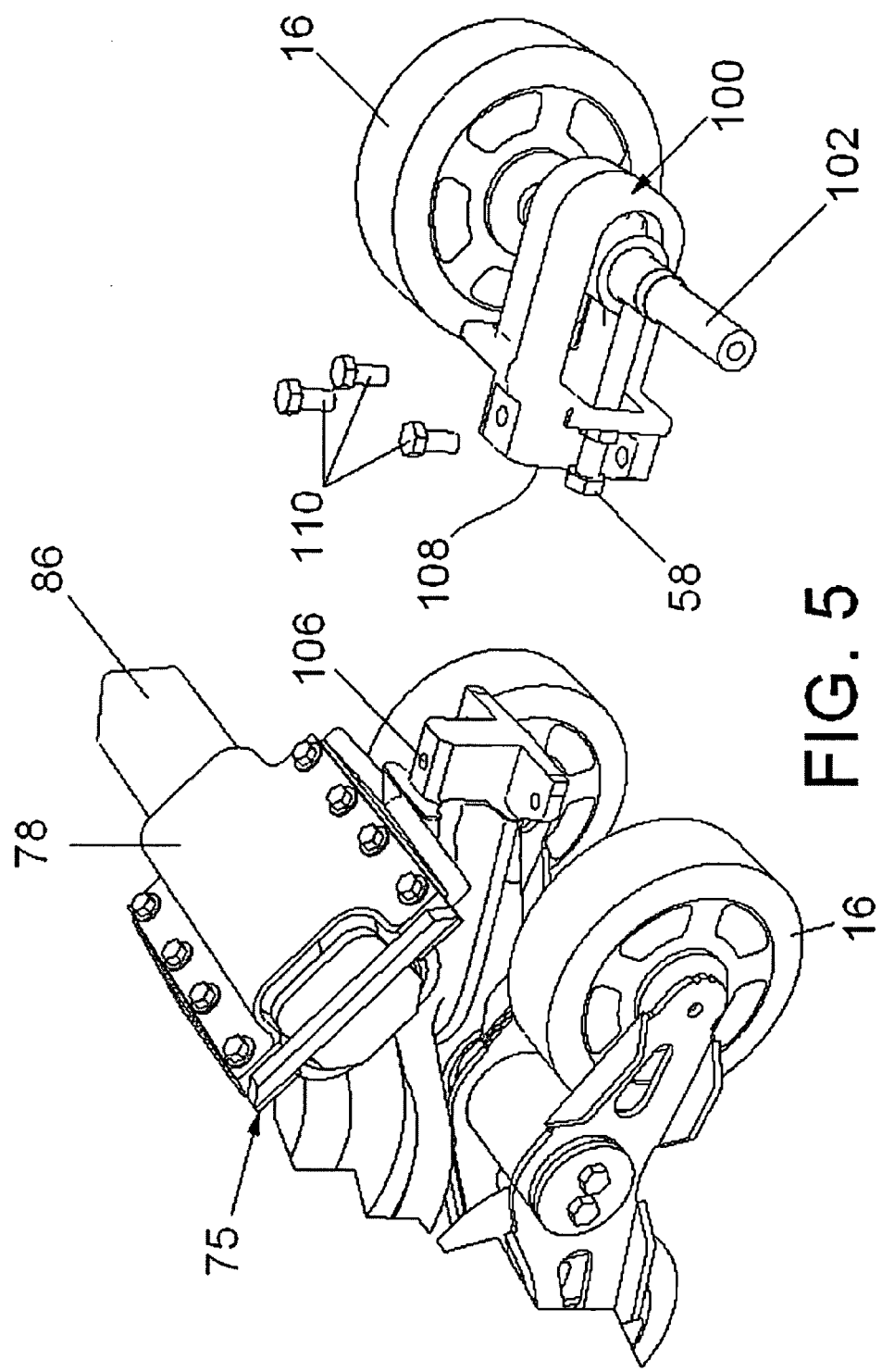
FIG. 5 shows a perspective view in exploded assembly to a removable nosepiece, track tensioner of the track assembly of FIG. 3.

With attention next directed to FIGS. 3, 4 and 5 and appreciating the advantages of the foregoing improvements, a track assembly 70 sized to support pickup trucks and similarly sized vehicles is shown that has been adapted to include several related improvements. The assembly 70 includes a unitary track frame 72 that supports an improved drive drum/sprocket 8 shown at FIG. 4 from a drive bore 74 and a torsion control assembly 75 at a bracket 76. The drive sprocket 8 includes a detachable hub 63 that is discussed below.

The torsion control assembly 75 includes a cover 78 that mates with the bracket 76 and retains a number of resilient shims 80 within a bore space 84. The shims 80 can be constructed of an elastomer of desired durometer or a variety of other resilient compressible/expansible materials. The shims 80 align to compress and re-expand to exert a counter force to resist rotation of a linkage arm 86 that attaches to the vehicle. In certain assemblies, the linkage arm 86 might comprise an axle and/or the torsion control assembly 75 might be fitted to an axle and/or may comprise an assembly that is not contained within a bore space. An air bag 17 might also be adapted to the assembly 70 to aid in torsion control.

Fitted to a pair of idler bores 88 are forward and aft idler or bogey wheel suspension assemblies 90. Each idler assembly 90 is supported from an idler suspension axle 92 at a sleeve bearing 94 and an intermediate resilient (e.g. elastomer) bushing 96. Each idler suspension assembly 90 includes a pair of idler wheels 16 that are secured between idler wheel support brackets 98 and 99 and a spacer bushing 97. The suspension assemblies 90 are attached to the ends of the suspension axles 92.

In distinction to conventional idler wheel suspensions, the resilience of the bushing 96 provides a freedom of movement at each idler suspension 90 whereby the axles 92 and suspensions 90 are able to flex within the bores 88. The flexion can be judiciously restrained to preferred movement axes, such as with stops fitted to adjoining members, or permit a limited range of 360° movement, such as in the assembly 70, to better maintain idler wheel contact with the track over changing terrain contours.

Extending from the forward end of the track frame 72 is a detachable nosepiece tensioner bracket 100, see also FIG. 5, that supports a pair of idler wheels 16. A sleeve or axle carriage 101 supports an axle 102 and a pair of end mounted idler wheels 16 in a slot 104. A groove 105 at the carriage 101 aligns with a rail 107 fitted to the nosepiece bracket 100 at the slot 104. The carriage 101 slides to and fro within the slot 102 along the rail 107. The tension placed on a track 4 is determined by the mounting location of the carriage 101 as established with a pair of threaded adjusters 58 that mount to the nosepiece bracket 100.

FIG. 5 depicts an exploded assembly view and additional detail to the detachable mounting of the tensioner 100 to an end piece 106 of the frame 72. In particular, an end flange 108 of the tensioner 100 is formed with bores that align to mating bores at the frame end 106. Associated fasteners 110 secure the flange 108 to the end piece 106. Threaded adjusters 58 project from the sides of the flange 108 and again determine the mounting position of the idler wheels 16 and the related tension on the track 4. As with the nosepiece tensioner 60, the detachment of the tensioner 100 facilitates the detachment of the track 4 from the frame 72 by increasing the available space to either mount or detach the track 4. Again, too, other portions of the frame 72 can be constructed to partially disassemble in the field to facilitate track repair or replacement.

Returning attention to FIG. 4, a further improvement that has been adapted into the track assembly 70 is the fitting of a detachable spindle or hub 63 to a drive sprocket 8 and that mounts to the drive bore 74. That is, the sprocket 8 is constructed in two pieces and wherein the hub 63 is secured to an inner flange 65 of the drum/sprocket 8 with several fasteners 67. Depending upon the application for the track assembly 70, several different styles and mounting configurations can be constructed at the hub 63 to facilitate the fitting of the different assemblies 70 to different vehicle/equipment axles. The hub 63 might for certain applications also be adapted into an appropriately modified track assembly 2.

With respect to the depicted hub 63, cooperating notches 69 are formed into the hub 63 that cooperate with projections 71, grooves or other alignable surfaces at the flange 65 to further facilitate track mounting. The projections 71 include bores that presently align to fastener bores at the intervening spacers between the notches 69 along the outer perimeter of the hub 63. Removal of sprocket 8 is effected upon releasing the fasteners 67 and rotating the sprocket 8 so the projections 71 can axially pass over the notches 69 and off the hub 63.

The notches 69 thus permit the removal of the sprocket 8 without disturbing the mounting of the spindle or hub 63 to the frame 72. Significantly, the sprocket 8 is removed without disturbing the spindle 63 and frame 72 connection which when performed in the field can result in contaminating the bearings and/or improper tightening of a spindle fastener (i.e. nut, not shown) which is properly set at the factory.

While the invention has been described with respect to presently preferred assemblies and considered improvements or alternatives thereto, still other assemblies and arrangements may be suggested to those skilled in the art. It is also to be appreciated that the features of the foregoing track frame constructions can be arranged in different combinations. For example, the resilient idler suspensions can be mounted to a rigid drive frame and/or can be supported to a sub-frame; the hub and drive sprocket/drum and/or detachable nosepiece tensioners can be fitted to any type of track assembly; and/or resilient axle beddings can be used at any of the track framework support axles. Air bag(s) can also be adapted to torsionally limit and control movement of the track frame relative to an adjacent support chassis. The foregoing description should therefore be construed to include all those embodiments within the spirit and scope of the following claims.

What is claimed is:

1. A vehicle track comprising:
   a) an endless track having a ground engaging exterior surface spanning opposed first and second circumferential peripheral edges;
   b) a framework mounted to a vehicle chassis and including i) a drive sprocket, ii) a plurality of idler wheels, iii) a plurality of first axles mounted to pivot a first longitudinal frame portion in transverse lateral relation to a second longitudinal frame portion coupled to a vehicle, and iv) a plurality of second axles mounted transverse to said first longitudinal frame portion, wherein said track is trained around said sprocket and idler wheels and said idler wheels are mounted to support an interior surface of said track as said track rotates around said framework, wherein a plurality of first and second suspensions mount to opposite ends of each of said plurality of second axles, wherein said first and second suspensions respectively contain first and second idler wheels and third and fourth idler wheels, wherein said second axles permit said first and second suspensions to longitudinally pivot, and wherein said first axles are mounted to laterally pivot each of said first and second suspensions about said second longitudinal frame portion, whereby said plurality of first and second suspensions independently rise and fall along longitudinal and lateral axes to sustain contact with said interior track surface with changing terrain contours; and
   c) resiliently compressible and expansible means for torsionally limiting rotation of said framework relative to said vehicle chassis.

2. A vehicle track as set forth in claim 1 wherein said first longitudinal frame portion comprises a plurality of frame sections, wherein at least one of said plurality of second axles extends from each of said plurality of frame sections, and wherein said first axles support said plurality of frame sections in parallel longitudinal alignment from said second frame section and wherein said second frame section supports said drive sprocket.

3. A vehicle track as set forth in claim 2 wherein at least one of said plurality of second axles is resiliently mounted such that said second axle can pivot laterally relative to a plane containing the center axis of said at least one second axle.

4. A vehicle track as set forth in claim 2 wherein at least one of said plurality of second axles is resiliently supported to said first longitudinal frame portion at an elastomer bushing.

5. A vehicle track as set forth in claim 1 wherein at least one of said first and second axles is supported from an elastomer bushing.

6. A vehicle track as set forth in claim 1 wherein said drive sprocket comprises a hub portion mounted to an axle of a supporting vehicle and a sprocket portion mounted concentric to said hub portion having surfaces that engage lugs that project from said interior track surface to rotate said track about said framework.

7. A vehicle track as set forth in claim 1 including a tensioner having a bracket supporting a plurality of tensioner wheels in adjustable contact with said interior track surface and wherein said bracket is detachably mounted to said framework, whereby the tensioner can be detached from said framework upon releasing the tensioner wheels from contact with said track.

8. A vehicle track as set forth in claim 1 including pneumatic means mounted between said framework and said vehicle chassis that resiliently compresses and expands to torsionally limit rotation of said framework relative to said chassis.

9. A vehicle track comprising:
   a) an endless track having a ground engaging exterior surface spanning opposed first and second circumferential peripheral edges;
   b) a framework mounted to a vehicle chassis and including i) a drive sprocket, ii) a plurality of idler wheels, and iii) a plurality of first axles mounted to transversely project from said framework and support said sprocket and plurality of idler wheels in rotational contact with an interior surface of the track;
   c) means coupling said plurality of first axles to said framework for resiliently supporting said idler wheels to laterally pivot; and
   d) resiliently compressible and expansible means for torsionally limiting rotation of said framework relative to said vehicle chassis, and wherein the idler wheels at said first axles independently pivot, rise and fall along multiple axes to sustain contact with said interior track surface with changing terrain contours.

10. A vehicle track as set forth in claim 9 wherein said framework comprises a plurality of first frame sections mounted in parallel relation from a second frame portion coupled to said vehicle, a plurality of second axles mounted to extend between each of said plurality of first frame sections, wherein said track is trained around said sprocket and idler wheels and said idler wheels are mounted to support an interior surface of said track adjacent said first and second circumferential peripheral edges as said track rotates around said framework, wherein a plurality of first and second suspensions mount to opposite ends of each of said plurality of first axles, and wherein said first and second suspensions respectively contain first and second idler wheels and third and fourth idler wheels.

11. A vehicle track as set forth in claim 9 wherein an elastomer bushing supports at least one of said first axles or idler wheels such that the supported first axle or idler wheel can pivot about a plurality of axes.

12. A vehicle track as set forth in claim 9 wherein said drive sprocket comprises a hub portion mounted to an axle of a supporting vehicle and a sprocket portion mounted concentric to said hub portion.

13. A vehicle track as set forth in claim 9 including a detachable portion of said framework that can be selectively detached from said framework to facilitate removal of the track without detaching the framework from the vehicle.

14. A vehicle track as set forth in claim 13 wherein said detachable frame portion comprises a tensioner having a bracket supporting a plurality of tensioner wheels in adjustable contact with said interior track surface and wherein said bracket is detachably mounted to said framework, whereby the tensioner can be detached from said framework upon releasing the tensioner wheels from contact with said track.

15. A vehicle track as set forth in claim 9 wherein said resiliently compressible and expansible means comprises an air bag.

16. A vehicle track assembly as set forth in claim 9 wherein said framework comprises a first frame portion secured to the vehicle chassis and including a first bearing plate, a second bearing plate mounted in sliding contact with said first bearing plate, a second frame portion including a plurality of frame sections, wherein a plurality of second axles aligned along said longitudinal framework axis couple said plurality of frame sections to independently pivot laterally relative to said first frame portion, wherein a plurality of idler wheel suspensions are mounted to pivot longitudinally from opposite ends of each of said first axles and each of the suspensions supports a plurality of said idler wheels in adjacent contact to one of the first and second circumferential peripheral track edges.

17. A vehicle track assembly as set forth in claim 16 wherein an elastomer bushing supports at least one of said second axles such that the supported second axle and idler wheels of the supported suspension can pivot about the plurality of axes independent of the longitudinal movement of the suspension.

18. A vehicle track comprising:
a) an endless track having a ground engaging exterior surface spanning opposed first and second circumferential peripheral edges;
b) a framework comprising i) a stationary frame portion coupled to a vehicle chassis, ii) a longitudinal frame portion, iii) a plurality of first axles longitudinally projecting along said longitudinal frame portion and securing said longitudinal frame portion to laterally pivot from said stationary frame portion and generally coextensive with an interior surface of said track and, iv) a plurality of second axles transversely projecting from said longitudinal frame portion, v) a plurality of idler wheel suspensions containing a plurality of idler wheels and mounted to said second axles such that each suspension supports a plurality of idler wheels to contact an interior surface of said track and laterally pivot with said longitudinal frame portion and wherein said idler wheel suspensions are further mounted to longitudinally pivot about said second axles independent of the lateral pivoting of said longitudinal frame portion about said first axles, and vi) a drive sprocket coupled to rotate said track around said framework, whereby said plurality of idler wheel suspensions and idler wheels independently rise and fall along longitudinal and lateral axes to sustain contact with said interior track surface with changing terrain contours.

19. A vehicle track as set forth in claim 18 wherein said idler wheel suspension are mounted to the opposite ends of each of said second axles and positioned adjacent said first and second peripheral track edges.

20. A vehicle track as set forth in claim 18 wherein said longitudinal frame portion comprises a plurality of frame sections, wherein a plurality of longitudinal, coaxially aligned first axles support each of said plurality of frame sections to said stationary frame, and wherein at least one of said plurality of second axles extends from each of said frame sections, such that the idler wheels supported from each frame section independently rise and fall along longitudinal and lateral axes to sustain contact with said interior track surface with changing terrain contours.

21. A vehicle track as set forth in claim 20 wherein said plurality of first axles collinearly support said plurality of frame sections.

22. A vehicle track as set forth in claim 21 wherein said second axles are supported to said idler wheel suspensions from elastomer bushings.

23. A vehicle track as set forth in claim 21 wherein the collinearly aligned first axles are supported in a plurality of concentrically surrounding elastomer bushings.

24. A vehicle track as set forth in claim 18 wherein at least one of said plurality of idler wheel suspensions is resiliently mounted to one of said second axles such that the included idler wheels are free to pivot laterally at said suspension relative to and independent of said longitudinal frame portion.

25. A vehicle track as set forth in claim 18 wherein at least one of said second axles is mounted to the longitudinal frame portion at an elastomer support and the idler wheel suspensions mounted to the at least one second axle are mounted at a second elastomer support such that the at least one second axle and included idler wheels can longitudinally, laterally and resiliently pivot relative to said longitudinal frame portion and the at least one second axle.

26. A vehicle track as set forth in claim 18 wherein said drive sprocket comprises a hub portion mounted to an axle projecting from the vehicle chassis and a sprocket portion mounted concentric to said hub portion.

27. A vehicle track as set forth in claim 26 including a detachable portion of said framework that can be selectively detached from said framework to facilitate removal of the track without detaching the framework from the vehicle.

28. A vehicle track as set forth in claim 27 wherein said detachable frame portion comprises a tensioner having a bracket supporting a plurality of tensioner wheels in adjustable contact with said interior track surface and wherein said bracket is detachably mounted to said framework, whereby the tensioner can be detached from said framework upon releasing the tensioner wheels from contact with said track.

29. A vehicle track as set forth in claim 28 wherein said tensioner wheels are mounted to an axle carriage that is supported to a longitudinal rail piece of said bracket and wherein an adjuster directs said axle carriage to selectively control idler wheel contact with said track.

30. A vehicle track as set forth in claim 18 including means mounted between said framework and the vehicle chassis that contains a media that resiliently compresses and expands to torsionally limit rotation of said framework relative to the vehicle chassis.

31. A vehicle track comprising:
a) an endless track having a ground engaging exterior surface spanning opposed first and second circumferential peripheral edges; and b) a framework mounted to a vehicle chassis and including a drive sprocket and a plurality of rotationally mounted idler wheels, wherein said track is trained to rotate around said drive sprocket and idler wheels, wherein said idler wheels are mounted to support an interior surface of said track as said track rotates around said framework, wherein said idler wheels are supported to a plurality of members that transversely project from a longitudinal frame portion, wherein at least one of said plurality of idler wheel support members is resiliently is supported to said longitudinal frame portion with an elastomer bushing such that said idler wheel is free to pivot within a limited range along multiple transverse axes relative to said longitudinal frame portion, and wherein said plurality of members are each mounted to pivot relative to each other in lateral relation to said longitudinal frame portion, such that said idler wheels can rise and fall about said longitudinal frame portion and in concert with said track and as said track follows changing terrain contours.

32. A vehicle track comprising:
a) an endless track having a ground engaging exterior surface spanning opposed first and second circumferential peripheral edges;
b) a framework mounted to a vehicle chassis and including a drive sprocket and a plurality of rotationally mounted idler wheels, wherein said track is trained to rotate around said drive sprocket and idler wheels, wherein said idler wheels are mounted to support an interior surface of said track as said track rotates around said framework, wherein said idler wheels are coupled to a plurality of members that transversely project from a longitudinal frame portion, and wherein said plurality of members are each mounted to pivot relative to each other in lateral relation to said longitudinal frame portion, such that said idler wheels can rise and fall about said longitudinal frame portion and in concert with said track and as said track follows changing terrain contours; and,
c) wherein said framework includes a detachable frame portion that can be selectively detached from said framework to facilitate removal of the track without detaching the framework from the vehicle.

33. A vehicle track as set forth in claim 32 wherein said detachable frame portion comprises a tensioner having a bracket supporting a plurality of tensioner wheels in adjustable contact with the interior track surface and wherein said bracket is detachably mounted to said framework, whereby the tensioner can be detached from said framework upon releasing the tensioner wheels from contact with said track.

34. A vehicle track as set forth in claim 33 wherein said tensioner wheels are mounted to an axle carriage that is supported to a longitudinal rail piece of said bracket and wherein an adjuster directs said axle carriage to selectively control tensioner wheel and idler wheel contact with said track.

35. A vehicle track assembly comprising:
a) an endless track having a ground engaging exterior surface spanning opposed first and second circumferential peripheral edges;
b) a framework mounted to longitudinally pivot from a vehicle chassis and including i) a drive sprocket, ii) a plurality of idler wheels, iii) a first frame portion including a first bearing plate, iv) a second frame portion including a plurality of frame sections and a second bearing plate mounted in sliding contact with said first bearing plate, wherein a plurality of first axles aligned along a longitudinal axis of said first frame portion couple said plurality frame of sections to independently pivot laterally from said first frame portion, iv) a plurality of second axles mounted to said frame sections to transversely project relative to the longitudinal axis, and v) wherein a resilient member supports each of a plurality of idler wheel suspensions to pivot longitudinally from opposite ends of each of said second axles and each of the idler wheel suspensions supports a plurality of said idler wheels in adjacent contact to the first and second circumferential peripheral track edges, such that the idler wheels independently rise and fall along multiple axes to sustain contact with said interior track surface with changing terrain contours; and
c) resiliently compressible and expansible means for torsionally limiting longitudinal rotation of said second frame portion relative to said first frame portion.

36. A vehicle track assembly comprising:
a) an endless track having a ground engaging exterior surface spanning opposed first and second circumferential peripheral edges;
b) a framework mounted to pivot from a vehicle chassis and including i) a drive sprocket, ii) a plurality of idler wheels, and iii) a plurality of first axles mounted to said framework to transversely project relative to a longitudinal axis of the framework and support said plurality of idler wheels in rotational contact with an interior surface of the track;
c) means coupling said plurality of first axles to said framework for resiliently supporting said idler wheels to laterally pivot relative to the longitudinal framework axis; and
d) resiliently compressible and expansible means for torsionally limiting longitudinal rotation of said framework relative to said vehicle chassis, and wherein the idler wheels at said first axles independently pivot laterally, rise and fall along multiple axes to sustain contact with said interior track surface with changing terrain contours.

37. A vehicle track assembly as set forth in claim 36 wherein an elastomer bushing supports at least one of said first or second axles such that the supported first or second axle can pivot about a plurality of axes.

38. A vehicle track comprising:
a) an endless track having a ground engaging exterior surface spanning opposed first and second circumferential peripheral edges;
b) a framework includes a drive sprocket and a plurality of rotatively mounted idler wheels, wherein said track is trained around said sprocket and idler wheels, wherein said idler wheels are mounted to support an interior surface of said track as said track rotates around said framework, wherein said idler wheels are coupled to a plurality of members that transversely project from a longitudinal frame portion, wherein at least one of said plurality of idler wheel support members is mounted to said longitudinal frame portion at an elastomer support such that said idler wheel support member can pivot about a 360° range of axes relative to said longitudinal frame portion, and wherein said plurality of members are each mounted to pivot relative to each other in lateral relation to said longitudinal frame portion, such that said idler wheels pivot, rise and fall about said longitudinal frame portion in concert with said track and as said track follows changing terrain contours.

* * * * *